United States Patent
Hess et al.

(10) Patent No.: US 6,426,574 B1
(45) Date of Patent: *Jul. 30, 2002

(54) ROTOR OF A TURBOGENERATOR HAVING DIRECT GAS COOLING INCORPORATING A TWO-STAGE FLOW CASCADE

(75) Inventors: Stephan Hess, Bad Sackingen (DE); Christoph Hirsch, Windisch (CH); Michael Jung, Waldshut-Tiengen (DE); Johann Schubert, Magenwil (CH); Hans Zimmerman, deceased, late of Monchaltorf (CH), by Verena Zimmerman, Meinrad Werner Zimmerman, legal representatives

(73) Assignee: Alstom, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,548

(22) Filed: May 5, 2000

Related U.S. Application Data

(63) Continuation-in-part of application No. 08/989,861, filed on Dec. 12, 1997, now abandoned.

(30) Foreign Application Priority Data

Dec. 21, 1996 (DE) .......................... 196 53 839

(51) Int. Cl.⁷ .............................. H02K 9/06; H02K 9/04; H02K 9/00
(52) U.S. Cl. .............................. 310/61; 310/62; 310/63; 310/270

(58) Field of Search ........................... 310/62, 63, 61, 310/60 R, 270; 415/176, 178, 180

(56) References Cited

U.S. PATENT DOCUMENTS

| 930,701 A | * | 8/1909 | Spalding ................. 310/62 |
| 982,830 A | * | 1/1911 | Kingsbury ............... 310/63 |
| 2,255,910 A | * | 9/1941 | Baudry .................... 310/2 |
| 5,894,178 A | | 4/1999 | Stefan .................... 310/61 |

FOREIGN PATENT DOCUMENTS

| DE | 610507-a | * | 2/1935 | ........... 310/63 |
| DE | 120 981 | | 7/1976 | |
| GB | 720521 A | * | 9/1952 | ........... 310/61 |
| JP | 08205473 A | * | 8/1996 | ........... 310/63 |
| JP | 0 084301-a | * | 3/1997 | ........... 310/63 |
| SU | 838923 A | * | 6/1981 | ........... 310/61 |
| SU | 1473018 A | * | 4/1989 | ........... 310/62 |
| SU | 1815742 A | * | 5/1993 | ........... 310/62 |

* cited by examiner

Primary Examiner—Karl Tamai
(74) Attorney, Agent, or Firm—Burns, Doane, Swecker & Mathis, L.L.P.

(57) ABSTRACT

In an air-cooled electrical machine having reverse cooling in a closed cooling circuit, a two-stage blade cascade for the optimum incident flow of cooling air to the rotor (4) and the rotor winding (29) is provided between a rotor cap plate (22) and a rotor shaft (28). The first blade cascade stage (30b) in the direction of flow is a deceleration cascade having pressure-generating properties, and the following blade cascade stage (30a) in the direction of flow is a deceleration cascade having deflecting properties.

9 Claims, 4 Drawing Sheets

ROTOR OF A TURBOGENERATOR HAVING DIRECT GAS COOLING INCORPORATING A TWO-STAGE FLOW CASCADE

CROSS-REFERENCE TO RELATED APPLICATIONS

This application is a continuation-in-part of copending patent application Ser. No. 08/989,861 filed Dec. 12, 1997 now abandoned.

FIELD OF THE INVENTION

The invention relates to a rotor of a turbogenerator having direct gas cooling.

BACKGROUND OF THE INVENTION

In generators which are operated according to the pressure-cooling principle, a main fan permits a swirled inflow of the cooling air into the overhang space of the pole zone of the rotor. That is, the residual swirl of the air at the outlet of the main fan ensures that the air rotates virtually without slip in front of the pole zone of the rotor. The inflow of cooling air into the mainly axial cooling passages, provided for this purpose, of the rotor and the rotor winding is therefore unproblematic in the case of the pressure-cooling principle.

In order to additionally increase the coolant flow rate in the rotor, it is proposed in DD 120 981, in the case of generators cooled by the pressure-cooling principle, to intensify the cooling of the rotor and its winding by means of an additional moving-blade cascade under the rotor cap. This moving-blade cascade is able to further reduce the so-called shock losses, which remain despite a residual swirl of the cooling air, when the cooling air enters the essentially axially running rotor cooling passages, so that the cooling of the rotor is optimized and the total losses are reduced.

In contrast, the main fans of generators working by the suction-cooling principle direct the cooling air first of all to a cooler, in the course of which the residual swirl of the cooling-air flow is rendered turbulent. In general, suction cooling, compared with pressure cooling, offers the advantage that the air leaving the coolers can be fed directly to the cooling passages in the entire generator and the temperature increase caused by the machine fan is eliminated. In this way, however, cooling air is fed to the rotor without the requisite swirl. The rotor must accelerate the cooling air first of all to peripheral velocity before it can enter the cooling passages. The rotor must therefore perform all the work in order to overcome the shock losses already mentioned. In the process, separation of the cooling-gas flow may occur, and the incident flow to the inlets of the rotor conductor elements may be incorrect. The consequence is then a greatly restricted cooling-air distribution with a corresponding risk to the entire rotor winding.

Although the use of a moving-blade cascade according to DD 120 981 is able to reduce this problem in the rotor cooling, which occurs in particular during suction cooling, it is unable to meet today's requirements for the cooling of rotors in limit-rating machines. This is because it is necessary here to deflect the cooling-gas flow by up to 80° during axial deflection, a factor which leads to the separation of the flow boundary layer at the blade wall in the case of a blade row proposed according to the prior art.

SUMMARY OF THE INVENTION

Accordingly, one object of the invention is to provide a novel rotor of a turbogenerator having direct gas cooling of the generic type, which rotor is preferably operated under suction cooling and can be cooled in an optimum manner.

The advantages of the invention may be seen, inter alia, in the fact that, due to a two-stage flow cascade, a desired pressure increase of the coolant flow is forced on the one hand in a first stage, and the requisite deflection of the coolant flow is carried out on the other hand in a second stage. Only such a functional separation between pressure increase and deflection of the coolant flow ensures an optimum incident flow, provided with minimum shock losses, to the cooling passages in the rotor body and in the rotor winding when applying the suction-cooling principle.

In an especially preferred embodiment of the invention, provision is made for the first stage of the flow cascade having pressure-generating properties to face the main fan of the electrical machine, and for the second stage of the flow cascade having deflecting properties to face the rotor winding overhang. Here, the flow cascades are separated from one another in axial direction; that is, they do not overlap one another in axial direction.

The moving blades of the stages of the moving-blade flow cascades have a curvature, whereas in the portion of the blades that are near to each other in the axial direction, the curvature of the blades of one stage of the moving blade flow is the same as the curvature of the blades of the adjacent stage of the moving-blade flow cascade in that portion. This arrangement prevents stalling of the cooling gas passing through the stages of the moving-blade flow cascades and thus to improve the rotor cooling.

A first spacing in a circumferential direction between adjacent moving blades of a stage of the moving-blade flow cascade is clearly greater than a second spacing in a circumferential direction between the blades of neighboring stages of the moving-blade flow cascade. Preferably the ratio of the second spacing to the first spacing is between 0.05 and 0.3.

An especially advantageous effect of the improved guidance of the coolant flow and thus of the cooling of the rotor appears if the walls between the inner margin of the rotor cap plate and the rotor shaft, which walls limit the coolant flow, have a contour converging conically toward the rotor winding overhang.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
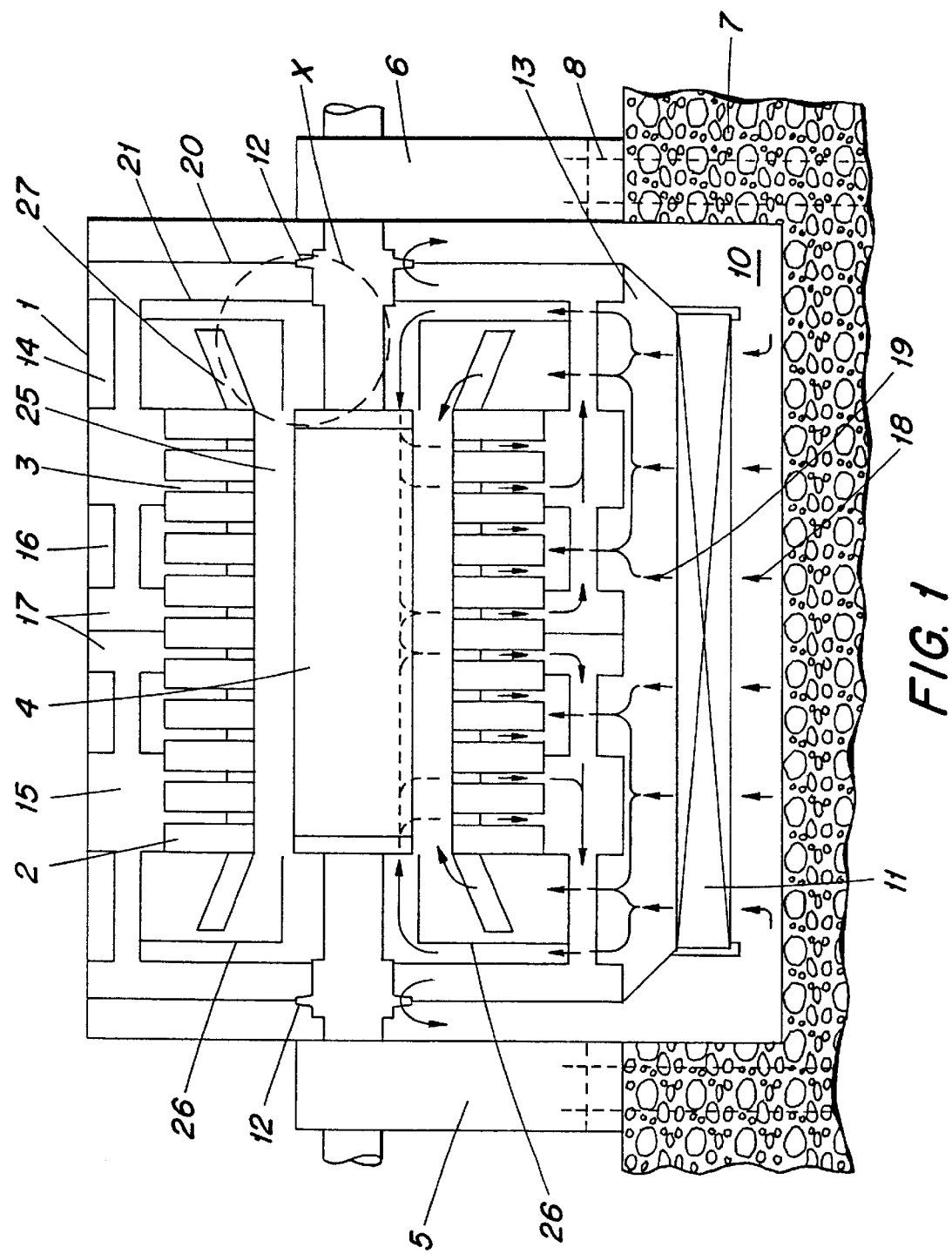
FIG. 1 shows a simplified longitudinal section through an air-cooled turbogenerator with closed cooling circuit according to the suction-cooling principle.

In the drawings, like reference numerals designate identical or corresponding parts throughout the several views and only the elements essential for understanding the invention are shown. An air-cooled turbogenerator, as shown in FIG. 1, has a machine housing 1 which encloses a laminated stator body consisting of laminated-body sections 2. In the laminated stator body, radial ventilation slots 3 are provided between the individual laminated-body sections 2. A rotor 4 is mounted in thrust blocks 5, 6 which are fastened to the foundation 7 by means of tie rods 8.

The foundation 7 has a foundation pit 10 which extends axially over the entire length of the machine housing 1 and takes up virtually the entire width of the housing 1. A cooling arrangement 11 of the machine is arranged in this foundation pit 10. In this case, the inlet openings of the cooling arrangement 11 are connected to outflow spaces of main fans 12 arranged on both sides of the rotor 4, and the outlet openings of the cooling arrangement 11 lead into a compensating space 13. The cooling gas flowing through the cooling arrangement 11 is shown by means of arrows, inflowing hot gas being designated by 18 and outflowing cold gas being designated by 19. All further arrows not designated in more detail show the cooling circuit of the cooling gas. The cooling circuit is indicated by arrows merely in one machine half, since the machine is of symmetrical construction with regard to the cooling.

The cooling principle involves so-called reverse or suction cooling in which hot gas 18 is fed to the cooling arrangement 11 by means of fans 12. The cooling-gas flow is apportioned in the compensating space 13 to the cold-gas chambers 14 and 16, in the course of which partial flows form. A first partial flow flows between baffle plates 26 and an inner casing 21 directly to the rotor 4, a second partial flow flows through the winding overhang 27 into the machine air gap 25, and a third cooling-gas flow passes through the cold-gas chambers 16 and ventilation slots 3 into the air gap 25. From the latter, the cooling-gas flow is drawn by the fans 12 through ventilation slots 3 and the hot-gas chambers 15 and 17 between the inner casing 21 and an outer casing 20 and is then directed through the foundation pit 10 to the coolers 11.

Figure 2:
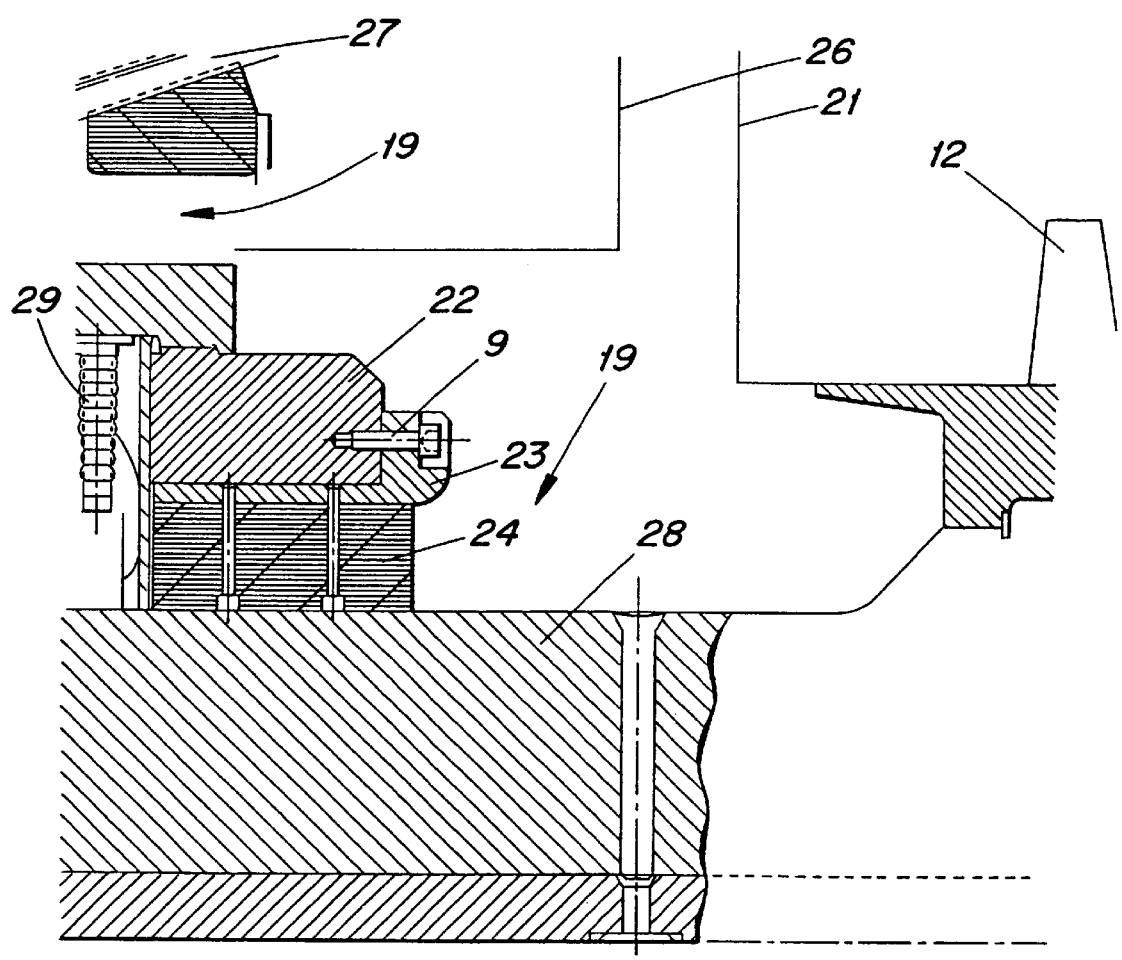
FIG. 2 shows the detail X according to FIG. 1 in enlarged and slightly more detailed longitudinal section.
Figure 3:
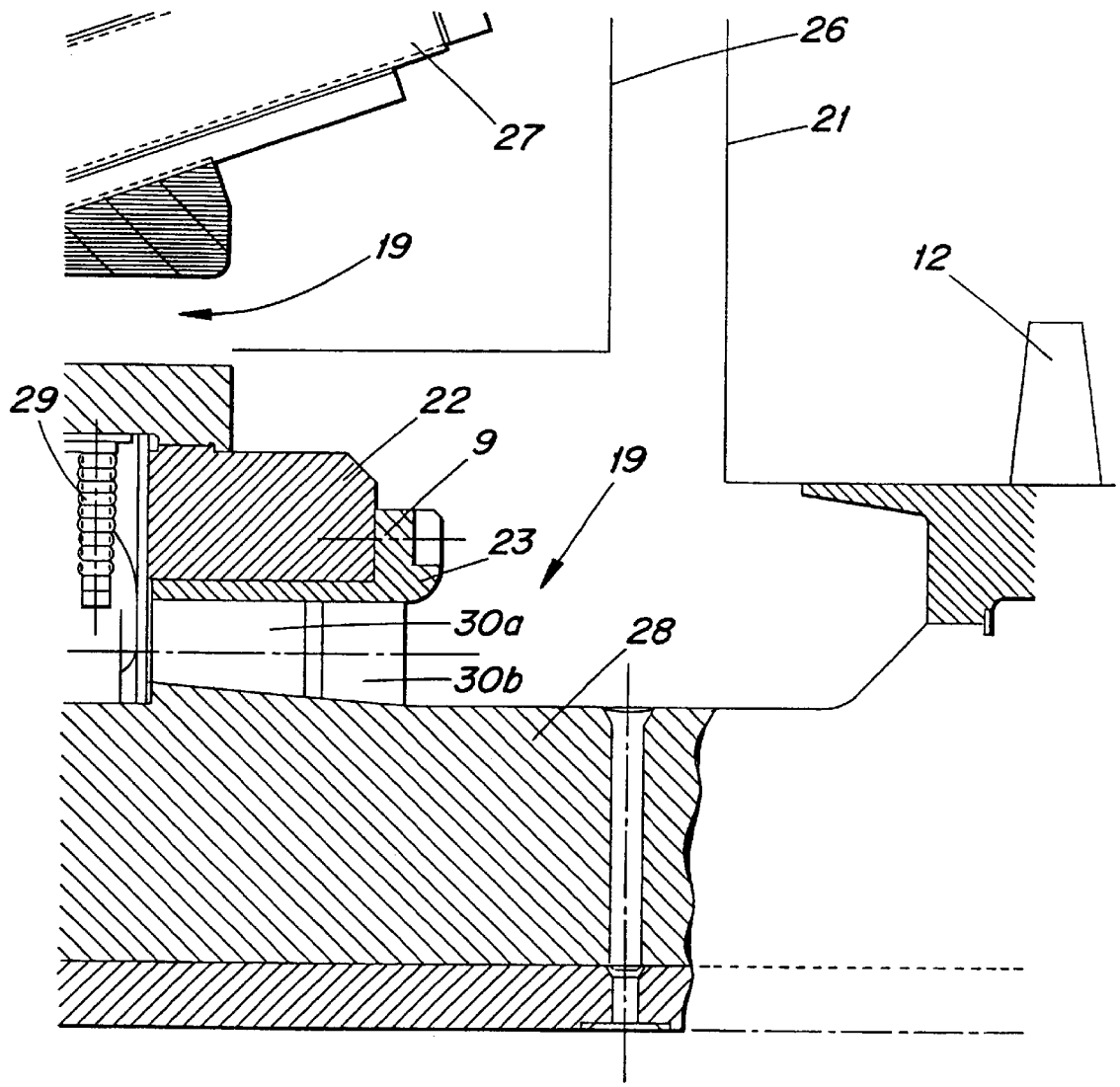
FIG. 3 shows the detail X according to FIG. 1 in a further longitudinal section.

FIG. 3, in an enlarged and thus more detailed sectional representation, shows the region of the cooling-gas feed to the rotor 4. The cooling air 19 flows between the baffle plate 26 and the inner casing 21 to a cooling-air inflow duct which is formed between a rotor shaft 28 and an annular support 23. This flow duct has a two-stage flow cascade 30a, 30b in the direction of flow toward a rotor winding 29, each flow-cascade stage in each case having a number of moving blades arranged on the inner periphery of the annular support 23. In this arrangement, the flow-cascade stages 30a, 30b are spaced apart in the axial direction of the rotor 4 in such a way that they do not overlap (cf. FIGS. 2 and 4).

The flow-cascade stage 30b nearest the fan 12 is designed as a deceleration stage having essentially pressure-generating properties, and the flow-cascade stage 30a following in the direction of flow and nearest the rotor winding 29 is designed as a deceleration stage having essentially deflecting properties. To further optimize the flow of coolant into the rotor 4, the flow duct is shaped so as to taper conically toward the rotor winding 29, the rotor shaft 28 being widened accordingly for this purpose. Here, it may be noted that this contouring represents an exemplary embodiment. Thus it is likewise conceivable according to the invention to carry out additional or exclusive contouring of the annular support 23.

Figure 4:
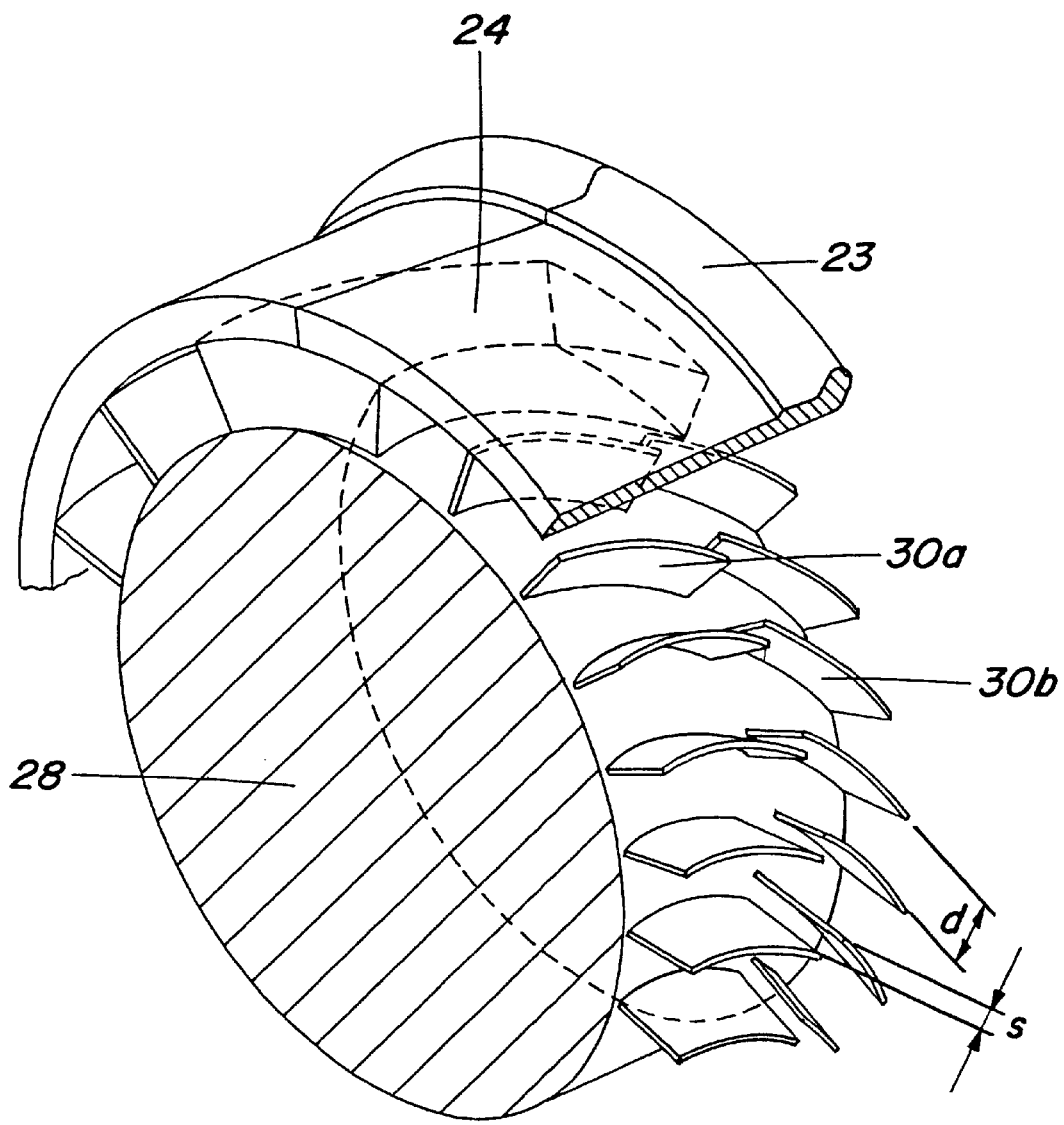
FIG. 4 shows a perspective sectional view of the annular support with moving blade flow cascades.

If the perspective sectional view of the inner periphery of the annular support 23 in FIG. 4 is considered, filling pieces 24 (only one of the filling pieces 24 is shown in FIG. 4) are provided here at regular intervals between adjacent moving blades of the individual flow-cascade stages. These filling pieces 24 are shaped in accordance with the blade contour of the flow-cascade stages 30a, 30b. FIG. 2 shows a longitudinal section through the filling piece 24 in FIG. 4.

As shown in FIG. 3 and 4, the moving blades 30a and 30b of the flow cascades are positioned between the annular support 23 and the rotor shaft 28, the blades of one stage having substantially the same curvature as the blades of the neighboring stage. The distance "d" in FIG. 4 is the distance in a circumferential direction between the moving blades of each stage (spacing). The distance "s" is the distance in a circumferential direction between the blades of each stage and the blades of the neighboring stage (staggering). Preferably, the ratio s/d is between 0.05 and 0.3.

The annular support 23 bears in axial direction with a flange against a rotor cap plate 22 and is connected to the latter by means of screws 9, as shown in FIG. 2. In order to ensure simple assembly and if need be dismantling of the annular support 23, it is constructed in two pieces, that is, as two half-rings (FIG. 4).

By the use of the blade-cascade stages described, a decisive reduction in the shock losses during the incident flow of coolant in rotors is achieved, an optimum incident flow to all rotor cooling passages being effected at higher coolant pressure. In this case, a coolant flow rate increased by 40% is achieved compared with the prior art.

A blade-cascade arrangement having three blade-cascade stages, for example, would also be conceivable within the scope of the invention.

Obviously, numerous modifications and variations of the present invention are possible in light of the above teachings. It is therefore to be understood that, within the scope of the appended claims, the invention may be practiced otherwise than as specifically described herein.

What is claimed is:

1. A rotor of a turbogenerator having direct gas cooling comprising: a main fan; a moving-blade flow cascade in an annular gap between an inner margin of a rotor cap plate and a rotor shaft, wherein the moving-blade flow cascade has at least two stages; the first stage of the moving-blade flow cascade being a deceleration cascade having predominantly pressure-generating properties, and the second stage of the moving-blade flow cascade being a deceleration stage having predominantly deflecting properties, wherein each of said stages include a plurality of blades.

2. The rotor as claimed in claim 1, wherein the first stage of the moving-blade flow cascade faces the main fan, and the second stage faces a rotor winding overhang.

3. The rotor as claimed in claim 1, wherein the first stage and the second stage of the moving-blade flow cascade do not overlap in an axial direction of the rotor.

4. The rotor as claimed in claim 1, wherein the walls between the inner margin of the rotor cap plate and the rotor shaft limit a cooling-gas flow and have a contour converging conically toward a rotor winding overhang.

5. The rotor as claimed in claim 1, wherein the moving-blade flow cascade includes a plurality of curved moving blades arranged in first and second stages, at least in a portion where the stages and thus their blades are adjacent to each other, the blades of the first stage having substantially the same curvature as the blades of the second stage in a direction axial of the rotor.

6. The rotor as claimed in claim 5, wherein the moving blades of a first stage of the moving-blade flow cascade are spaced apart from adjacent moving blades of the same stages in a direction circumferential of the rotor by a first predetermined distance, and the adjacent stage blades are spaced from the first stage blades in a direction circumferential of the rotor by a second predetermined distance, the ratio of the second predetermined distance to the first predetermined distance is between about 0.05 and 0.3.

7. The rotor as claimed in claim 1, wherein each flow cascade stage includes a plurality of blades arranged on the rotor cap plate.

8. A rotor of a turbogenerator having direct gas cooling comprising:

a main fan;

a moving-blade flow cascade in an annular gap between an inner margin of a rotor cap plate and a rotor shaft, the moving-blade flow cascade having at least two stages with each stage including a plurality of blades arranged on the rotor cap plate, a first stage of the moving-blade flow cascade being a deceleration cascade having predominantly pressure-generating properties, and a second stage of the flow cascade being a deceleration stage having predominantly deflecting properties.

9. The rotor as claimed in claim 8, wherein the moving-blade flow cascade stages are spaced apart in an axial direction of the rotor so that the flow cascade stages to not overlap.

* * * * *